United States Patent [19]

Kawamura et al.

[11] Patent Number: 5,107,484
[45] Date of Patent: Apr. 21, 1992

[54] ARRANGEMENT OF RECORDING/REPRODUCING APPARATUS

[75] Inventors: Ichiro Kawamura; Yasuhisa Fukushima, both of Osaka, Japan

[73] Assignee: Matsushita Electric Industrial Co., Ltd., Japan

[21] Appl. No.: 370,013

[22] Filed: Jun. 23, 1989

[30] Foreign Application Priority Data

Jun. 28, 1988 [JP] Japan ................................ 63-160086
Jun. 28, 1988 [JP] Japan ................................ 63-160088

[51] Int. Cl.$^5$ .............................................. G11B 17/04
[52] U.S. Cl. ................................. 369/244; 369/77.2; 360/99.06; 360/99.12
[58] Field of Search ............... 369/36, 38, 77.2, 75.2, 369/244, 196, 291, 292; 360/85, 98.05, 98.06, 98.07, 99.02–99.11, 102, 105, 72.1, 133, 135, 137

[56] References Cited

U.S. PATENT DOCUMENTS

| | | | |
|---|---|---|---|
| 3,883,090 | 5/1975 | Hall, Sr. ........................ | 360/99.12 X |
| 4,185,730 | 1/1980 | Roes et al. ..................... | 360/99.12 X |
| 4,665,454 | 5/1987 | Tsuchiya et al. ................ | 360/99.06 |
| 4,736,357 | 4/1988 | Uehara et al. .................. | 369/77.2 X |
| 4,802,041 | 1/1989 | Uehara .......................... | 360/99.06 |
| 4,829,504 | 5/1989 | Sunaga et al. .................. | 369/77.2 X |
| 4,872,076 | 10/1989 | Uehara et al. ................. | 360/99.07 |
| 4,873,596 | 10/1989 | Harada et al. .................. | 360/99.11 |
| 4,890,276 | 12/1989 | Ono et al. ...................... | 369/77.2 |
| 4,941,060 | 7/1990 | Uehara .......................... | 360/99.05 |
| 4,977,787 | 12/1990 | Klös-Hein et al. .............. | 360/105 X |

Primary Examiner—Paul Ip
Attorney, Agent, or Firm—Lowe, Price, LeBlanc & Becker

[57] ABSTRACT

There is disclosed herein a recording/reproducing apparatus including a magnetic field supply device for recording and reproducing of information and a cartridge holder for holding a cartridge having therein a recording disc. The apparatus includes a first motor for driving the recording disc when the cartridge is inserted into the cartridge holder, a sliding member adapted to be engaged with the cartridge holder to cause the disc to be disengageable with the first motor, a rotatable lever engageable with the sliding member so as to cause the recording disc to be disengageable with the first motor, and a geared transmission coupled to a second reversible motor and having an engaging portion which is engageable with the rotatable lever to cause the disc to be disengageable with the first motor. Also included in the apparatus are an arm having the magnetic field supply device and a drive mechanism coupled to the geared transmission so as to be driven in accordance with the rotation of the second motor and connected to the arm which is movable in accordance with a movement of the drive mechanism to cause the magnetic field supply device to move to be close to the magnetic disc and separated therefrom.

10 Claims, 12 Drawing Sheets

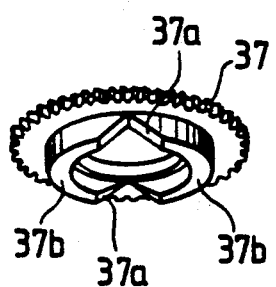
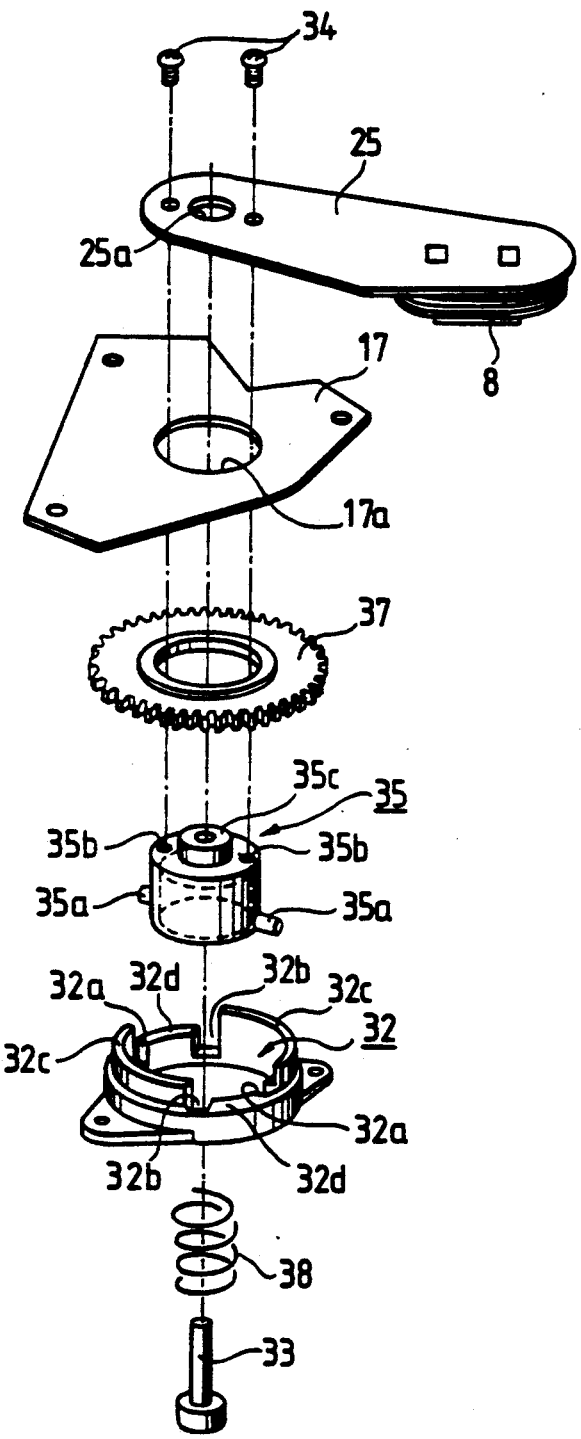

ARRANGEMENT OF RECORDING/REPRODUCING APPARATUS

BACKGROUND OF THE INVENTION

The present invention relates to a photomagnetic type recording/reproducing apparatus which uses a cartridge to hold therein a recording disc and requires supply of a magnetic field of recording and erasure of information, and more particularly to arrangements for the movement of the magnetic field supply section in the apparatus and for the loading of the cartridge.

Recently, attracted is a system using a recording disc, which is referred to as a photomagnetic disc, which allows writing, reproduction and erasure of information with laser light.

Generally, the photomagnetic disc is required to expose the recording medium by a magnetic field in writing and erasing the information. Thus, conventionally, it is general to dispose a coil on a recording surface of the disc so as to provide a magnetic field. Further, the photomagnetic disc is housed in a cartridge in order to protect the recording surface against dust and fingerprints.

However, since prior art apparatus using such a photomagnetic disc is required to be arranged such that the driving devices such as driving motors and solenoids are controlled successively by a microcomputer and a control circuit, there is provided problems that the electric circuits become complex. In addition, a relatively large electric power should be required for operation of the solenoids and the computer control tends to be affected by noises, thereby resulting in having a trouble due to the disturbance of the sequence.

SUMMARY OF THE INVENTION

It is therefore an object of the present invention to provide a recording/reproducing apparatus which is capable of easily and simply performing successively the movement of the magnetic field supply section concurrently with release of the cartridge from the loading without using the solenoids or the like.

In accordance with the present invention, there is provided a recording/reproducing apparatus comprising: a first motor engaged with a recording disc encased in a cartridge mounted on said apparatus to rotate said recording disc; engaging means for engaging said recording disc with said first motor; releasing means engageable with said engaging means to releasing said recording disc from said first motor; moving means for moving said magnetic field supply means for supplying a magnetic field onto said magnetic disc in accordance with rotation of a second motor; transferring means for transferring the rotation of said second motor to said releasing means and said moving means, said transferring means being arranged so as to independently take a first transferring state for transferring the rotation of said second motor to only said releasing means and a second transferring state for transferring the rotation of said second motor to only said moving means.

In accordance with the present invention, thereis further provided a recording/reproducing apparatus including magnetic field supply means for recording and reproducing of information, comprising: a cartridge holder for holding a cartridge having therein a recording disc; a disc-driving motor arranged to allow engagement with said recording disc in said cartridge when said cartridge is inserted into said cartridge holder; a sliding member adapted to be engaged with said cartridge holder, said sliding member being movable in substantially parallel to a chassis of said apparatus so as to cause said recording disc to be disengageable with said disc-drive metor; a rotatable lever, at one end portion, engageable with said sliding member so as to cause said recording disc to be disengageable with said disc-drive motor; toothed wheel means coupled to a reversible motor so as to be driven by the rotation of said reversible motor, said toothed wheel means having an engaging portion which is engageable with the other end portion of said rotatable lever to cause said recording disc to be disengageable with the disc-driving motor; an arm having at its one end portion said magnetic field supply means; and drive mechanism means coupled to said toothed wheel means so as to be driven in accordance with the rotation of said reversible motor and connected to said arm which is movable in accordance with a movement of said drive mechanism to cause said magnetic field supply means to move to be close to said magnetic disc and separated therefrom.

Preferably, the drive mechanism includes cam means and rotating member connected to said arm and rotated along the configuration of said cam means whereby said arm is movable up and down and rotatable in accordance with the rotation of said reversible motor.

BRIEF DESCRIPTION OF THE DRAWINGS

The object and features of the present invention will become more readily apparent from the following detailed description taken in conjunction with the accompanying drawings in which:

FIGS. 2A and 2B are exploded views of a principal portion of the FIG. 1 recording/reproducing apparatus;

FIGS. 4 to 9 are illustrations for describing operation of the FIG. 1 apparatus;

DETAILED DESCRIPTION OF THE INVENTION

Prior to describing the embodiment of the present invention, the prior art technique will be described hereinbelow with reference to FIGS. 11A to 16 for a better understanding of the invention.

Figure 11A:
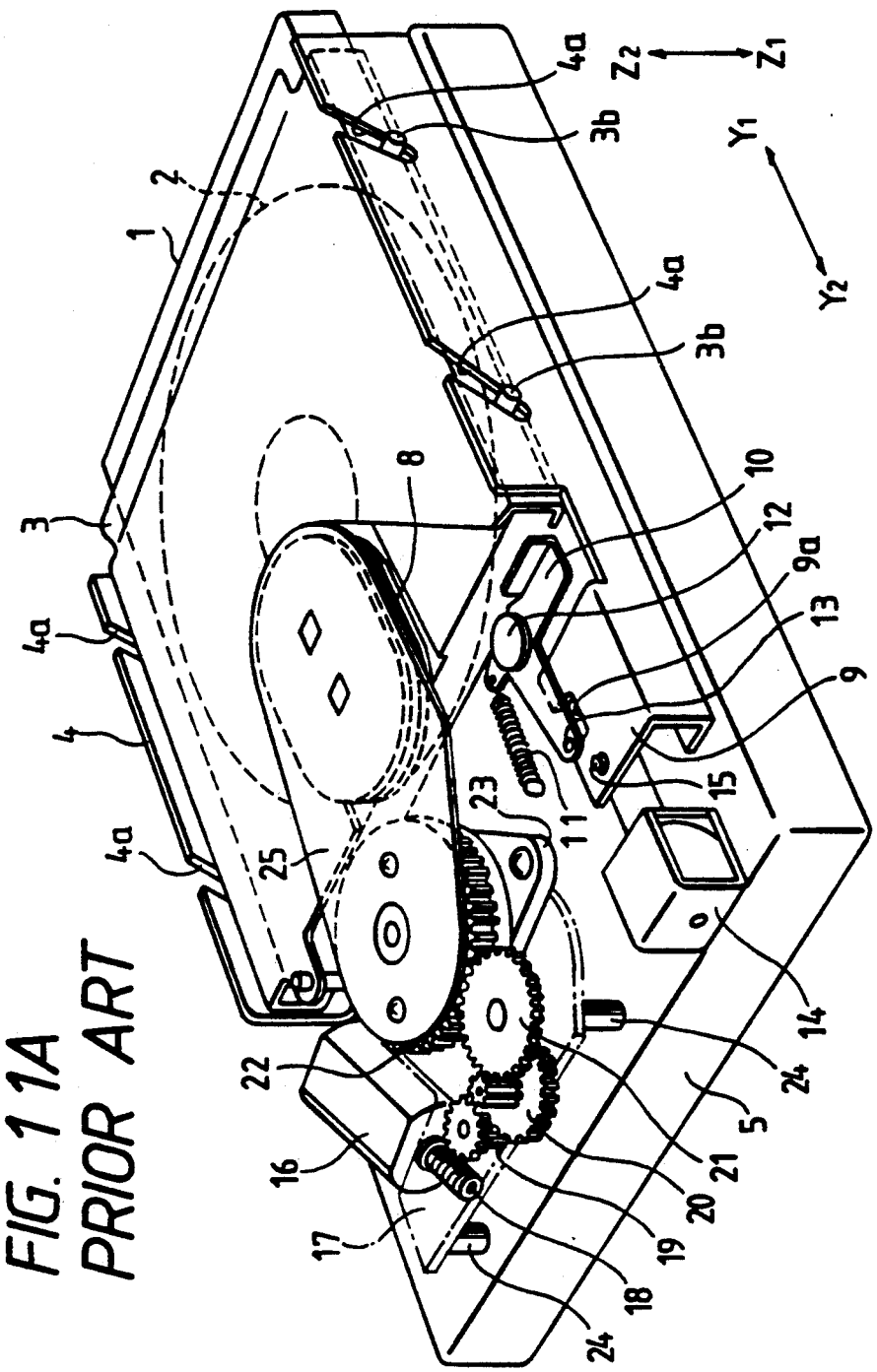
FIGS. 11A to 11C are perspective views showing an arrangement of a conventional recording/reproducing apparatus.

FIG. 11A is a schematic diagram showing an arrangement of a recording/reproducing apparatus which uses a photomagnetic disc. In FIG. 11A, illustrated at numeral 1 is a cartridge which holds therein a disc 2 and has opening portions 1a and 1b (see FIG. 11C) at its front and rear surfaces. The cartridge is held by a cartridge holder 3 made of a sheet metal. Numeral 4 is a so-called slider which is arranged to be slidable in directions of arrows Y1 and Y2 in the figure and biased in the Y1 direction by means of a spring (not shown). The slider 4 has four obliquely formed notches 4a which are respectively engaged with four pins 3b mounted on the cartridge holder 3. Further, the cartridge holder 3 has an engaging portion 3c which is in turn engaged with a pin 5c planted on a chassis 5 so that the cartridge holder 3 is restricted so as not to be moved in the Y1 or Y2 direction. On the slider 4 is provided a lock portion 9 having a notch portion 9a.

Numeral 10 represents a lock lever which is supported by means of a pin 12 so as to be rotatable with respect with the chassis 5, a pin 13 provided at one end portion of the lock lever 10 being engaged with the notch portion 9a of the lock portion 9. The lock lever 10 is coupled through a spring 11 to the chassis 5 so as to be urged whereby an end portion 10a thereof is movable in the direction of the arrow Y1. Illustrated at numeral 14 is a solenoid which is engaged with the lock portion 9, mounted on the slider 4, by means of a pin 15. In response to energization, the solenoid 14 draws the slider 4 in the Y2 direction. Also included in the apparatus is a drive motor 16 used as a driving source, the rotation of which is transferred through a worm gear 18 and flat toothed wheels 19, 20, 21 to a toothed wheel 22 after speed-reduction due to the flat toothed wheels 19, 20 and 21. Numeral 17 denotes a subchassis for supporting the drive motor 16, the flat toothed wheels 19 to 21 and the toothed wheel 22. The subchassis 17 is attached to the chassis 5 through a pole 24. Here, In the figure, the subchassis 17 is indicated perspectively for helping understanding. That is, the flat toothed wheels 19 to 21 and the flat toothed wheel 22 are disposed at the lower side of the subchassis 17.

Figure 11B:
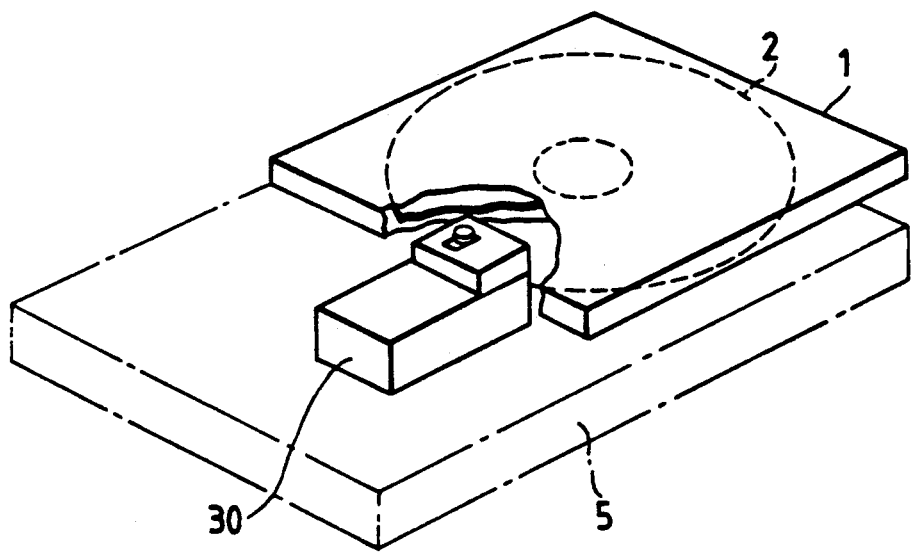
Figure 11C:
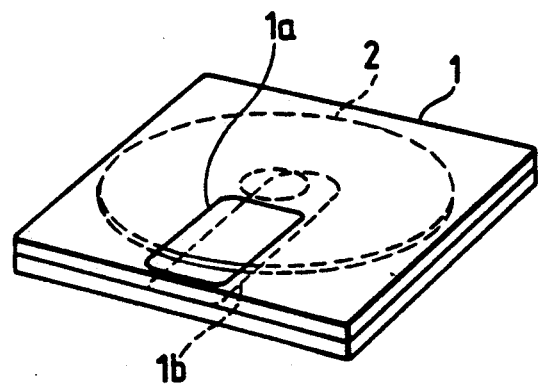
Figure 12A:
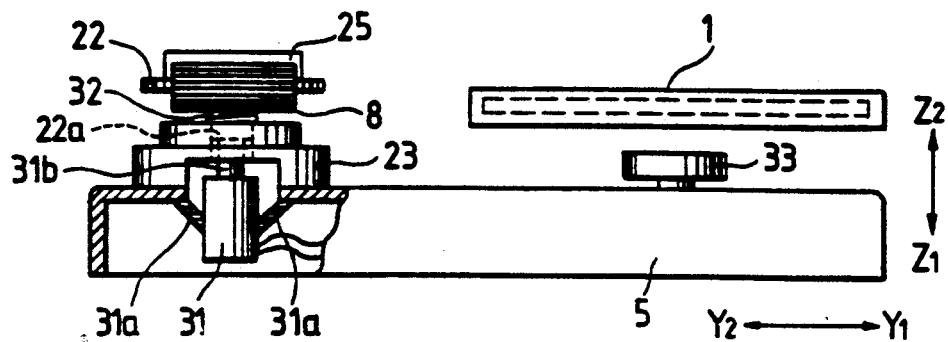
FIGS. 12A to 16 are illustrations for describing operation of the FIG. 11 conventional recording/reproducing apparatus.
Figure 12B:
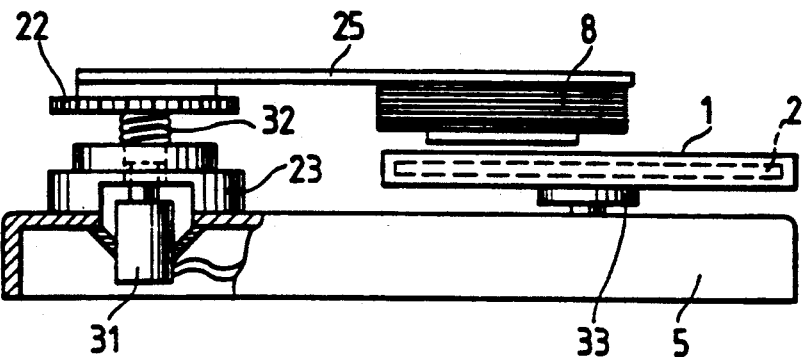
Figure 12C:
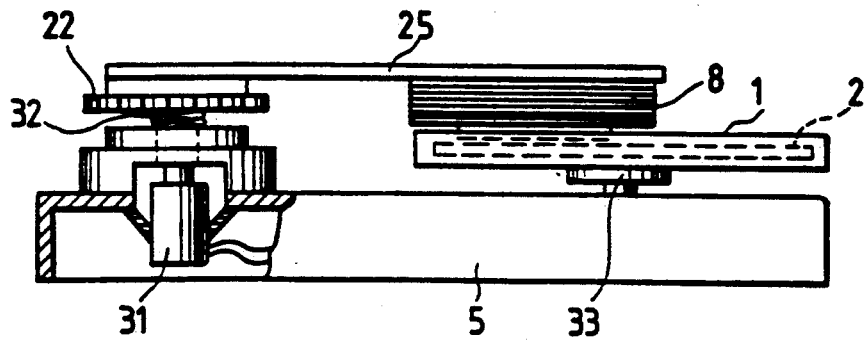

Further included in the apparatus is an arm 25 which is attached to the toothed wheel 22 and, at the other end portion, attached to a coil 8 acting as the magnetic field supply means. Numeral 23 depicts a bearing under which disposed is a solenoid 31 (see FIGS. 12A to 12C) for moving the arm 25 up and down in Z1 and Z2 directions. The bearing 23 supports the arm 25 so as to be rotatable in directions of arrows R1 and R2 (see FIG. 16) and slidable in the Z1 and Z2 directions. The solenoid 31 is fixedly secured to the chassis 5 by means of a stay 31a and has a core 31b which is connected to a boss 22a mounted on the toothed wheel 22. The boss 22a and the bearing 23 are fitted with each other. Between the toothed wheel 22 and the bearing 23 is provided a coil spring 32 which is arranged along the circumference of the boss 22a. The toothed wheel 22 and the arm 25 are biased in the direction of the arrow Z2 by means of the coil spring 32. FIG. 11B shows the mounting of the optical head where a head 30 is positioned under the cartridge 1 so as to illuminate laser light on the recording surface of the disc 2.

A description will be given hereinbelow in terms of operation of the conventional apparatus with the above-described arrangement with reference to FIGS. 12A, 12B, 12C and 13 to 16.

Figure 13:
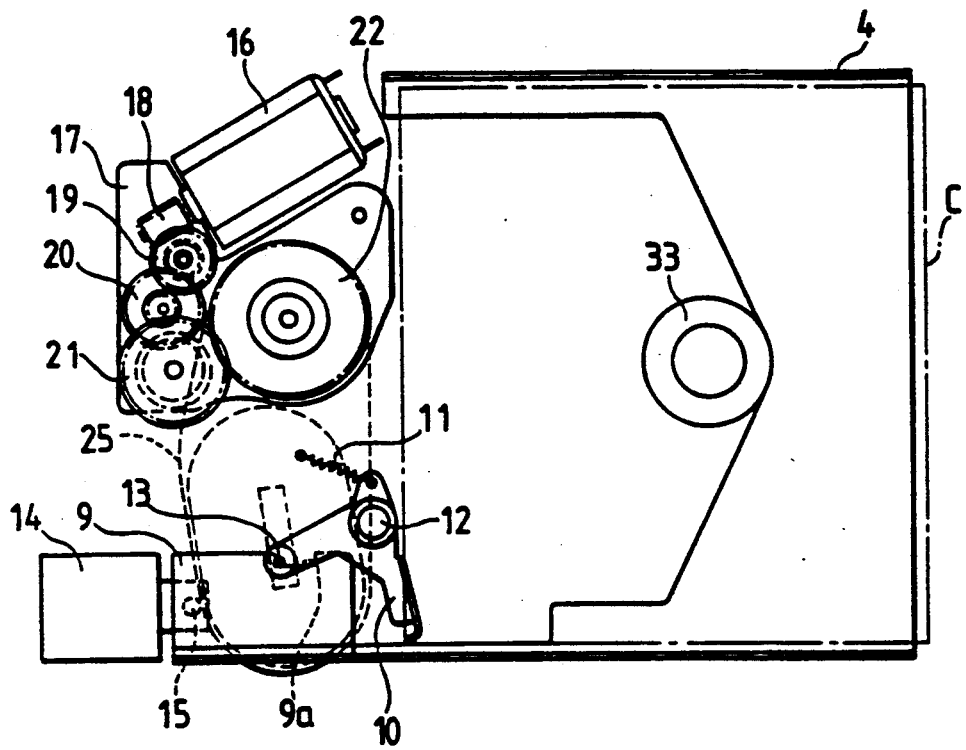
Figure 14:
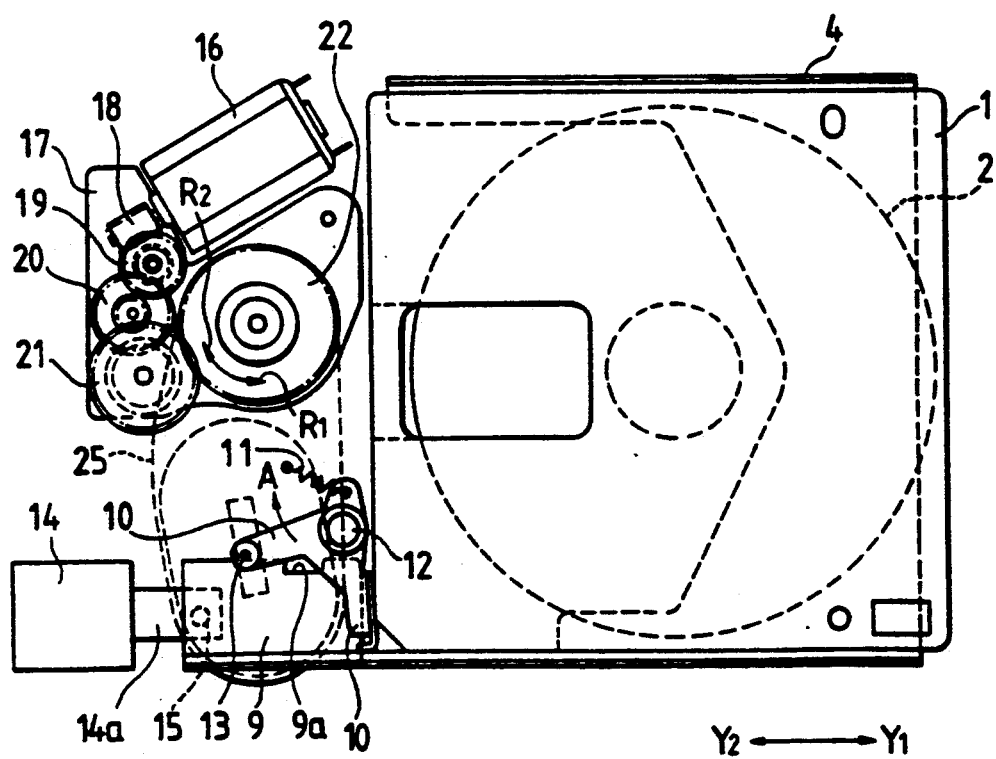

FIG. 13 shows the state before the cartridge is mounted on the apparatus, where the portion surrounded by an alternate long and short dash line (arrow C) represents a space for mounting the cartridge 1. As seen from the figure, the arm 25 is separated from the cartridge-mounting space. Further, the pin 13 is engaged with the notch portion 9a of the lock portion 9 of the slider 4 so as to restrict the movement of the slider 4. FIG. 14 illustrates the state after the cartridge 1 is mounted thereon from the Y2 direction. The lock lever 10 is pushed by an end portion of the cartridge 1 to be rotated in the direction of an arrow A in the figure so that the pin 13 is released from the notch portion 9a. Therefore, because, as described above, the slider 4 is biased in the Y1 direction by a biasing means (not shown), it is slided in the Y1 direction, whereby the cartridge holder 3 together with the cartridge 1 moved downwardly because the slider 4 and the cartridge holder 3 are engaged with each other through the pin 3a and the notch portion 9a.

Figure 15:
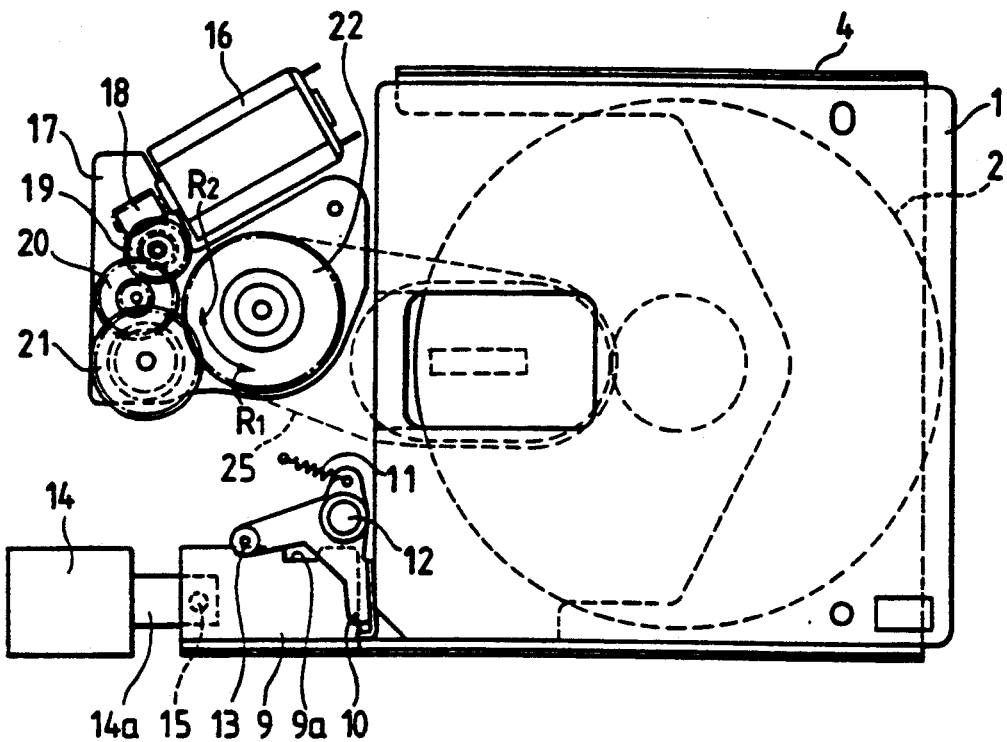

Furthermore, in response to energization of the motor 16, the rotational force thereof is transferred through the worm gear 18 and flat toothed wheels 19 to 21 so that the toothed wheel 22 and the arm 25 are rotated in the direction of the arrow R1 in the figure. At this time, since the cartridge 1 has been already moved downwardly, the arm 25 and the cartridge 1 do not interfere with each other. That is, since the cartridge 1 is moved downwardly by means of the movements of the slider 4 and the cartridge holder 3 up to a position shown in FIG. 13B after the cartridge 1 is mounted at a position illustrated in FIG. 12A, the arm is rotatable without interference. Thereafter, in response to energization of the solenoid 31, the toothed wheel 22 and the arm 25 are lowered in the Z1 direction against the biasing force of the spring 32 so that the coil 8 approaches the disc 2, thereby resulting in the state shown in FIG. 12C. With this state, when a motor 33 is to rotate the disc 2 and the coil 8 is energixed, a magnetic field is applied onto the surface of the disc 1 and the recording and erasure of signals to and from the disc can be achieved with operation of the optical head 30. In the state of FIG. 15, in response to deenergization of the solenoid 31, the toothed wheel 22 and the arm 25 are moved upwardly by means of the biasing force of the coil spring 32 in the Z2 direction.

Figure 16:
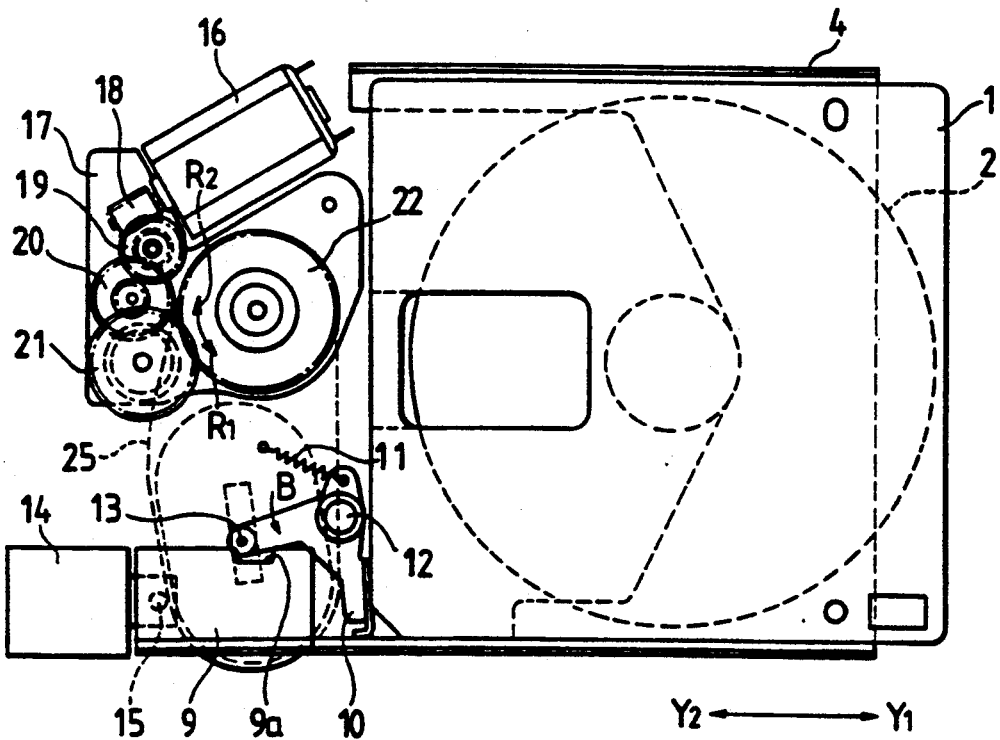

Furthermore, on the contrary, when the motor 16 is energized in the reverse direction, the arm 25 is rotated in the direction of the arrow R2 whereby the cartridge 1 and the arm 25 do not interfere with each other as shown in FIG. 16. Finally, in response to energization of a solenoid 14, the slider 4 is drawn in the Y2 direction the cartridge 1 rises in the Z2 direction because the cartridge holder 3 and the slider 4 are engaged with each other through the pin 3a and the notch portion 4a, thereby resulting in the state shown in FIG. 16. In this state, when the cartridge 1 is taken out in the Y1 direction, the lock lever 10 is rotated in the direction of an arrow B so that the pin 13 and the notch portion 9a are engaged with each other, thereby returning to the initial state, i.e., the state of FIG. 13.

The above-described operation is made by successively operate the motors 16, 33 and solenoids 31, 14 using a combination of a general microcomputer and motor and solenoid control circuits. Thus, in the above-mentioned prior art apparatus, since it is required to respectively and successively control the motor 16, solenoids 14, 31 with the microcomputer and control circuits, as described above, there are problems in that the electric circuits become complex, a relatively large electric power is required to operate the solenoids and the control by the computer is apt to be affected by noises to cause distrubance of the sequence to thereby easily result in occurrence of a trouble.

FIGS. 1 through 10 shows an embodiment of the present invention which will be described hereinbelow with reference to the drawings, where parts corresponding to those in FIGS. 11A through 16 are marked with the same numerals and a detailed description thereof will be omitted for brevity.

Figure 1:
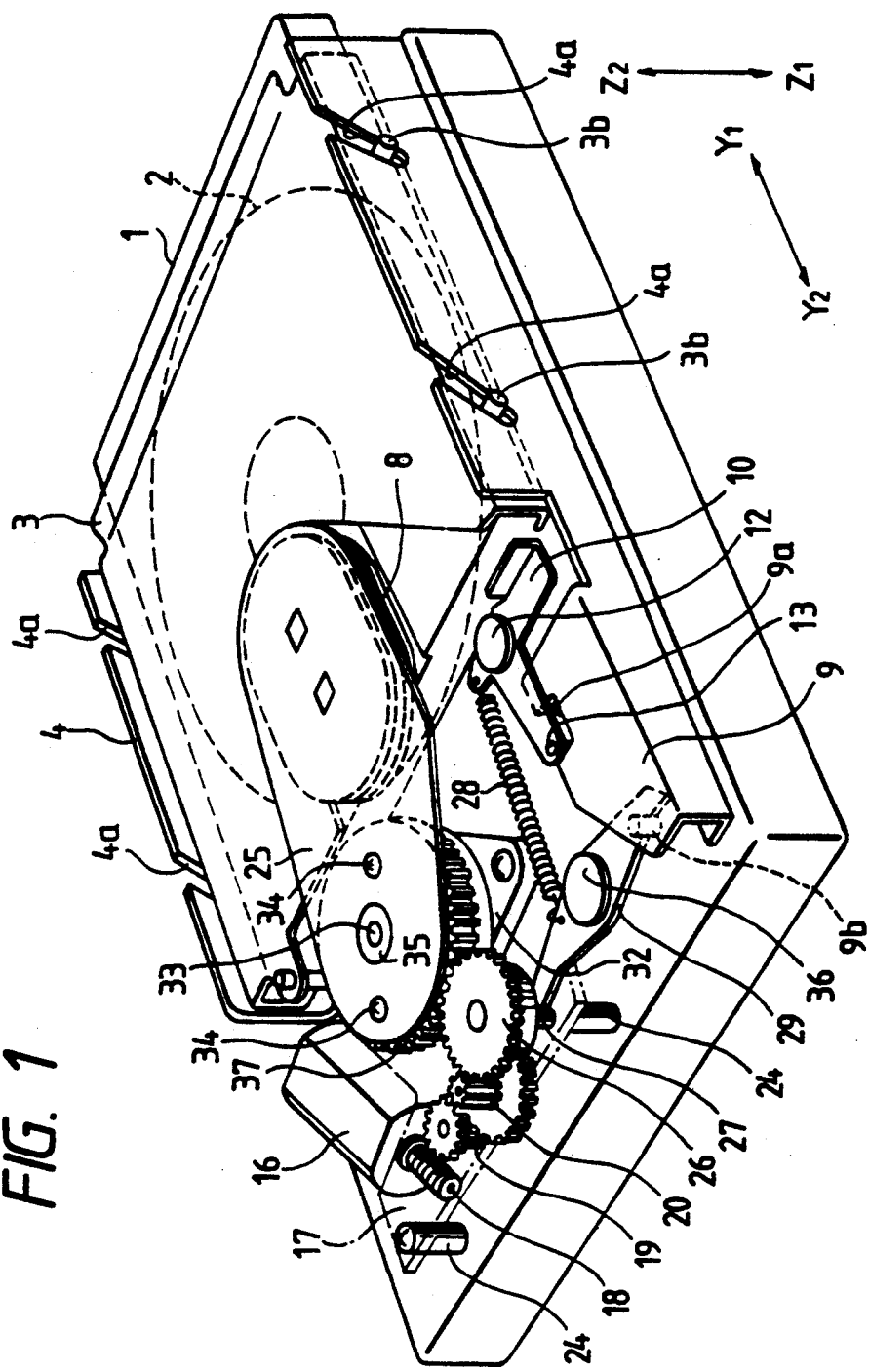
FIG. 1 is a perspective view showing an arrangement of a recording/reproducing apparatus according to an embodiment of the present invention.

In FIG. 1, a recording/reproducing apparatus according to the embodiment of the present invention similarly includes a cartridge 1, a disc 2, a cartridge holder 3, a slider 4, chassis 5, coil 8, a lock portion 9, a lock lever 10, a spring 11, pins 12, 13, a drive motor 16, worm gear 18, flat toothed wheels 19, 20, a stay 24, a subchassis 17, and a motor 33 which have configurations and functions similar to those in the above-mentioned prior art apparatus. Also included in the apparatus is an optical head 30 whose arrangement is similar to the optical head 30 illustrated in FIG. 11B.

Illustrated at numeral 26 is a flat toothed wheel (corresponding to the toothed wheel 22 in FIG. 11A) which has a pin 27 positioned at an end portion of a surface thereof and extending downwardly. Numeral 28 denotes a spring disposed between the lock lever and a release lever 29 acting as a releasing means for releasing the cartridge 1 from the disc-driving motor 33. The release lever 29 is coupled to the chassis 5 through a pin 36 so as to be rotatable about the pin 36. Further, numeral 32 represents a rotation-supporting table (which will be described in detail hereinafter), numeral 33 designates a pin upwardly planted on the chassis 5, numeral 35 depicts a rotating boss acting as a movement means for moving the magnetic field supply means attached to one end portion of an arm 25, and numeral 37 is a ring-like toothed wheel which is a portion of a transferring means disposed on the rotation-supporting table 32.

FIGS. 2A and 2B are exploded views showing the principal parts of the apparatus of this embodiment. As illustrated in FIG. 2A, a ring-like toothed wheel 37 is equipped with a ring-like rib 37b and two notch portions 37a which are arranged so as to act as a cam. Further, as illustrated in FIG. 2B, a rotatable boss 35 is provided with two pin-like engaging portions 35a and two screw holes 35b which are engaged with screws 34 so that the rotatable boss 35 is integrally coupled to the arm 25. Reference 35c represents a boss to be fitted with a hole 25a of the arm 25. Here, the inside of the rotatable boss 35 is hollowed out as indicated by dotted line in the figure.

Figure 3A:
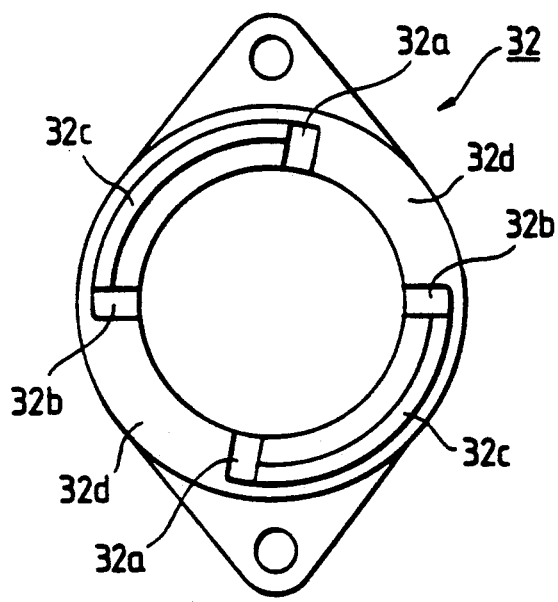
FIGS. 3A and 3B are a top view and a cross-sectional view showing a rotation-supporting table used as a component of the FIG. 1 apparatus.
Figure 3B:
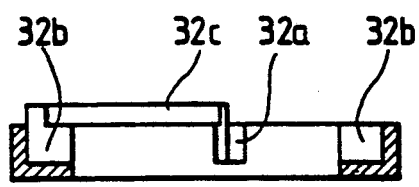

A rotation-supporting table 32, as shown in the plan view of FIG., 3A and in the cross-sectional view of FIG. 3B, has two square holes 32a formed symmetrically or diametrically and two another square holes 32b similarly formed symmetrically or diametrically, and a rib 32c is provided between each of the square holes 32a and each of the square holes 32b. Further, reference 32d designates flat portions which act as a first guiding configuration. On the other hand, the square holes 32b and the ribs 32c function as a second guiding configuration.

In the parts illustrated in FIGS. 2A to 3B, the rotatable boss 35 is adapted to be fitted with a pin 33 upwardly planted on the chassis 5 and at this time a coil spring 38 is encased in the inside of the rotatable boss 35. The rotation-supporting table 32 is attached to the chassis 5 so as to be coaxial with the pin 33, and the engaging portions 35a are adapted to be fitted into the square holes 32a. The inner circumference of the ring-like toothed wheel 37 is slightly greater than the outer circumference of the rotatable boss 35 so that the ring-like toothed wheel 37 is arranged to be rotatable smoothly around the rotatable boss 35. On the ring-like toothed wheel 37 is provided a subchassis 17, and the rotatable boss 35 is inserted into a hole 17a of the subchassis 17.

Moreover, a boss 35a of the rotatable boss 35 is fitted with a hole 25a of the arm 25 so that the arm 25 is rotatable with the rotatable boss 35 by means of the two screws 34.

In addition to the above-described assembling, the drive motor 16 and flat toothed wheels 19, 20 and 26 are incorporated there, thereby resulting in taking the arrangement as illustrated in FIG. 1.

Figure 4:
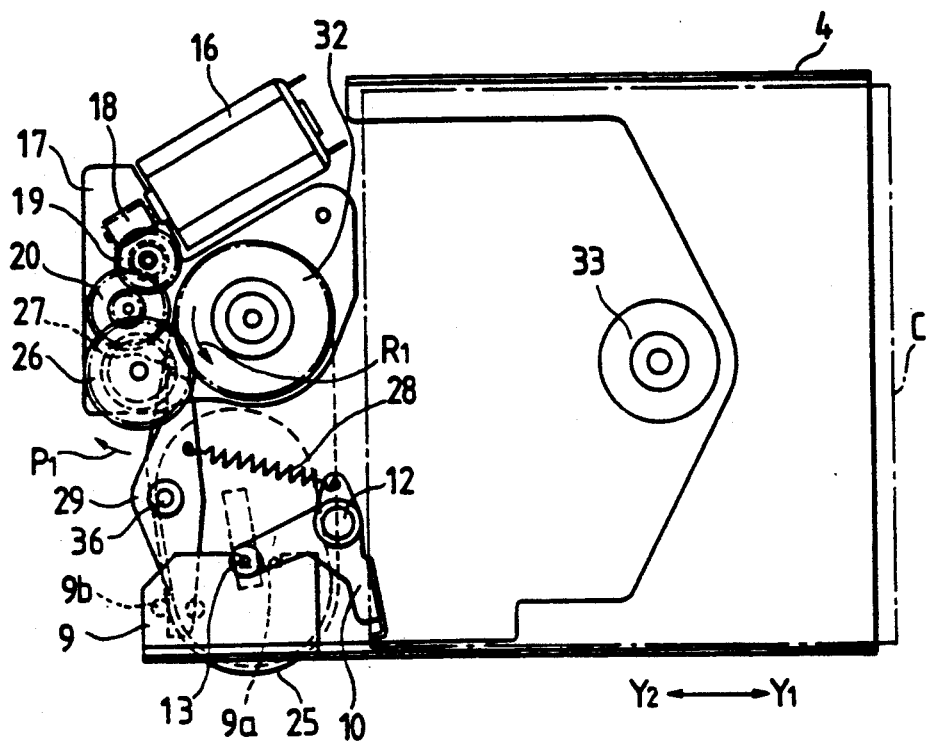
Figure 9:
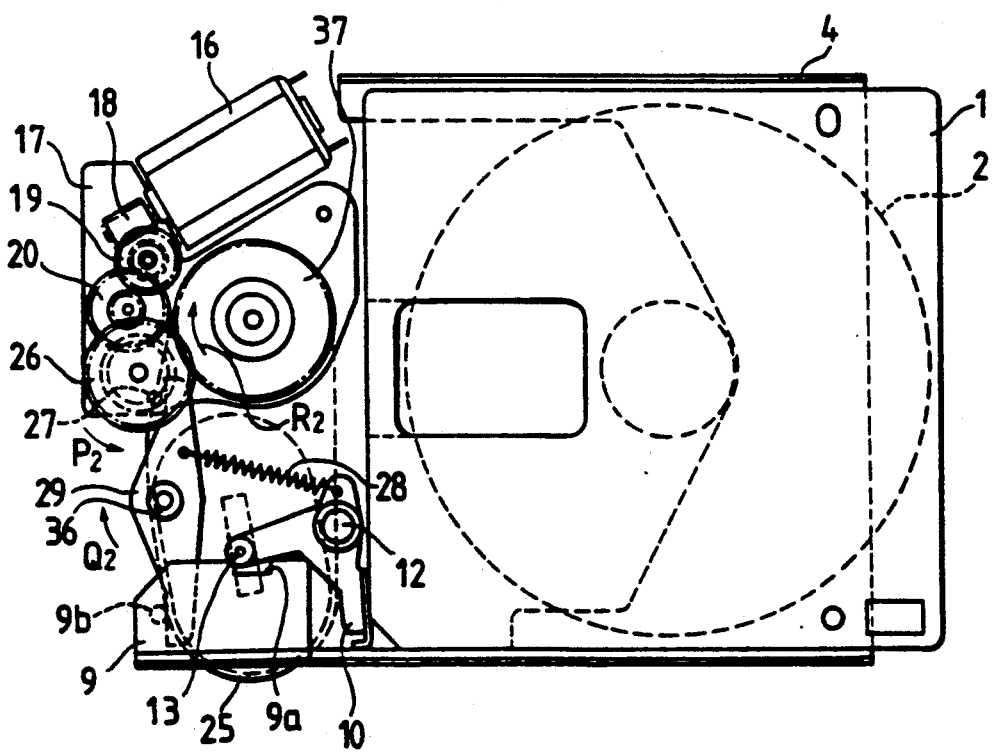
Figure 10:
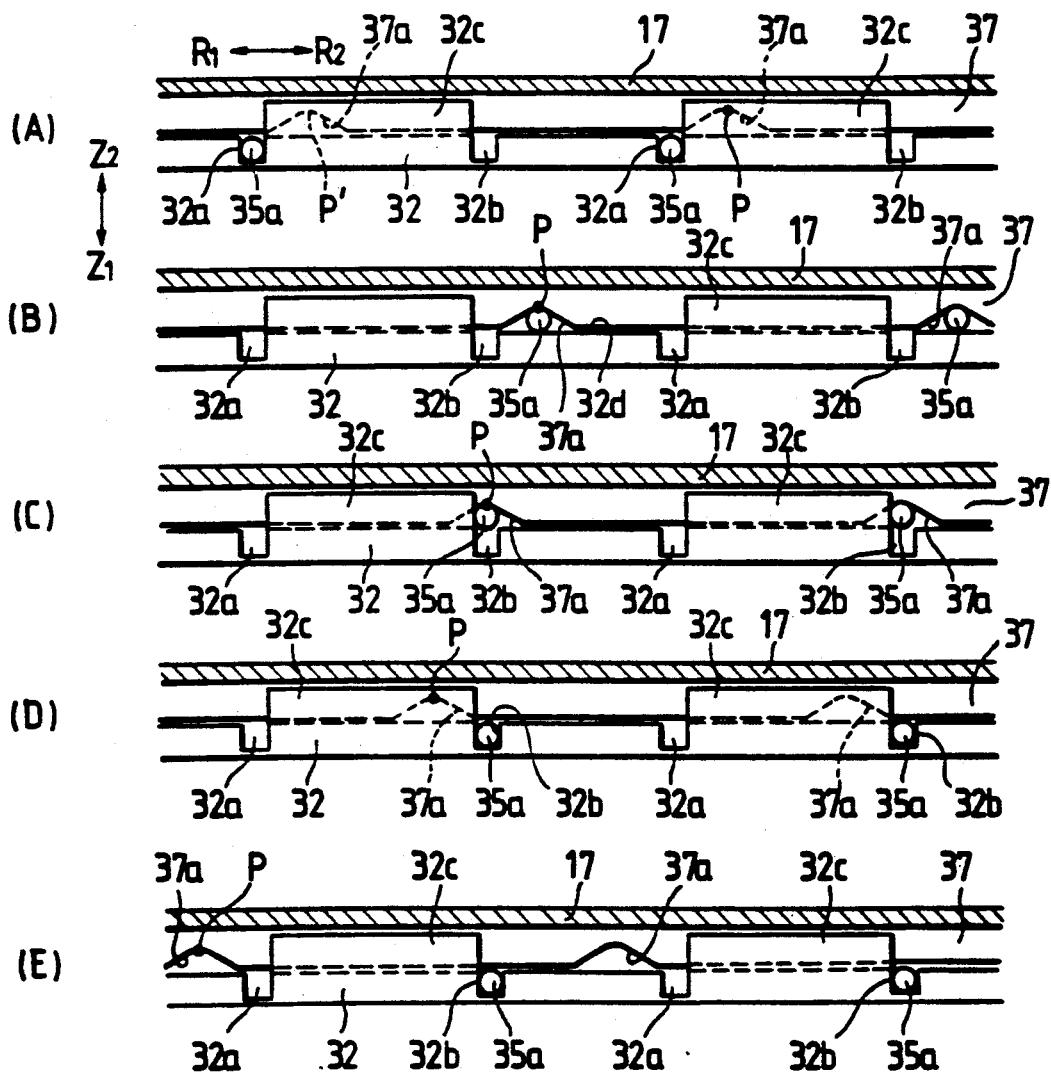
FIG. 10 is a development illustration for describing operation of the principal portion shown in FIG. 2A and 2B.

Secondly, operation will be described hereinbelow with reference to FIGS. 4 through 10, FIGS. 4 to 9 being illustrations useful for understanding the operation and FIG. 10 is development illustrations for describing the movements and engagement of the rotatable boss 35, ling-like toothed wheel 37 and rotation-supporting table 32. FIG. 4 shows the state before the cartridge 1 is mounted thereon as well as FIG. 13 showing the conventional apparatus, where a dashed line (arrow C) represents a space in which the cartridge 1 is placed. As illustrated in the figure, in this instance, the arm 25 is separated from the space for placing the cartridge 1, and the pin 13 is engaged with the notch portion 9a of the lock portion 9 of the slider 4 so that the movement of the slider 4 is limited. In response to insertion of the cartridge 1 from the direction of an arrow X, the apparatus takes the state illustrated in FIG. 5. The lock lever 10 is pushed by an end portion of the cartridge 1 so as to be rotated in the direction of the arrow A whereby the pin 13 comes out of the notch portion 9a. Therefore, as described above, the slider 4 is slided in the direction of an arrow Y1 because of biasing in the Y1 direction. Here, since the slider 4 and the cartridge holder 3 are engaged with the pin 3b and the notch portion 9a, the cartridge holder 3 is moved downwardly together with the cartridge 1. Thereafter, in response to energization of the motor 16, the rotating force is transferred through the worm gear 18 and flat toothed wheels 19, 20, 26 so that the ring-like toothed wheel 37 is rotated in the direction of an arrow R1.

The states of the rotatable boss 35, ring-like toothed wheel 37 and rotation-supporting table 32 illustrated in FIG. 4 correspond to the states thereof shown in FIG. 10A. That is, the engaging portion 35a of the rotatable boss 35 is fitted into the square hole 32a, and the rotatable boss 35 is pushed upwardly in the Z2 direction by means of the biasing force of the coil spring 38 and the upwardly movement thereof is restricted by the ring-like toothed wheel 37. The ring-like toothed wheel 37 is also limited by the subchassis 17 so as not to be moved in the Z2 direction. Namely, in the state shown in FIGS. 4 or by (A) of FIG. 10, the rotatable boss 35 is kept to be at the downwardly moved position with the engaging portion 35a being inserted in said square holes 32b.

When the ring-like toothed wheel 37 is rotated in the R1 direction, the apparatus is transferred from the state of (A) of FIG. 10 to the state of (B) of FIG. 10. Here, for description, the notch portion 37a of the ring-like toothed wheel 37 is marked with a point P. When transferring from the state of (A) of FIG. 10 to the state of (B) of FIG. 10, the point P is moved in the R1 direction. At this time, when the point p is shifted above the square hole 32b, the restriction in the Z2 direction with respect to the engaging portion 35a is lost whereby the engaging portion 35, i.e., the rotatable boss 35, is moved upwardly in the Z2 direction by means of the biasing force of the coil spring 38 and as shown by (B) of FIG. 10 it is engaged with the notch portion 37a of the ring-like toothed wheel 37 so as to move on the flat portion 32d of the rotation-supporting table 32, that is, the rotatable boss 35 is rotated in the R1 direction. The above-mentioned operation is performed similarly for the P' side.

In addition, in response to the ring-like toothed wheel 37 being rotated in the R1 direction, the apparatus takes the state of (C) of FIG. 10. Here, the engaging portion 35a comes into contact with the rib 32c. Further, when the ring-like toothed wheel 37 is rotated in the R1 direction and the point P is moved in the R1 direction, the engaging portion 35a is forced into the square hole 32b by the function of the slope of the notch portion 37a. That is, the rotatable boss 35 is moved downwardly in the direction of the shaft of the disc-drive motor 33, i.e., in the Z1 direction. Here, the apparatus takes the state of FIG. 7. When the ring-like toothed wheel 37 is further rotated in the R1 direction so as to take states of (D) to (E) of FIG. 10. At this time, the rotatable boss engaging portion 35a is kept to be fitted in the square hole 32b.

That is, the rotatable boss 35 kept to the downwardly moved state as illustrated by (A) of FIG. 10 is once moved upwardly in response to the rotation of the ring-like toothed wheel 37 in the R1 direction and then rotated up to a position at which the rib 32c comes into contact with the engaging portion 35a. Thereat, the rotatable boss 35 is moved downwardly and kept at the downwardly moved position. The ring-like toothed wheel 37 is continuously rotated even after the rotatable boss 35 is kept in the downwardly moved state.

Figure 5:
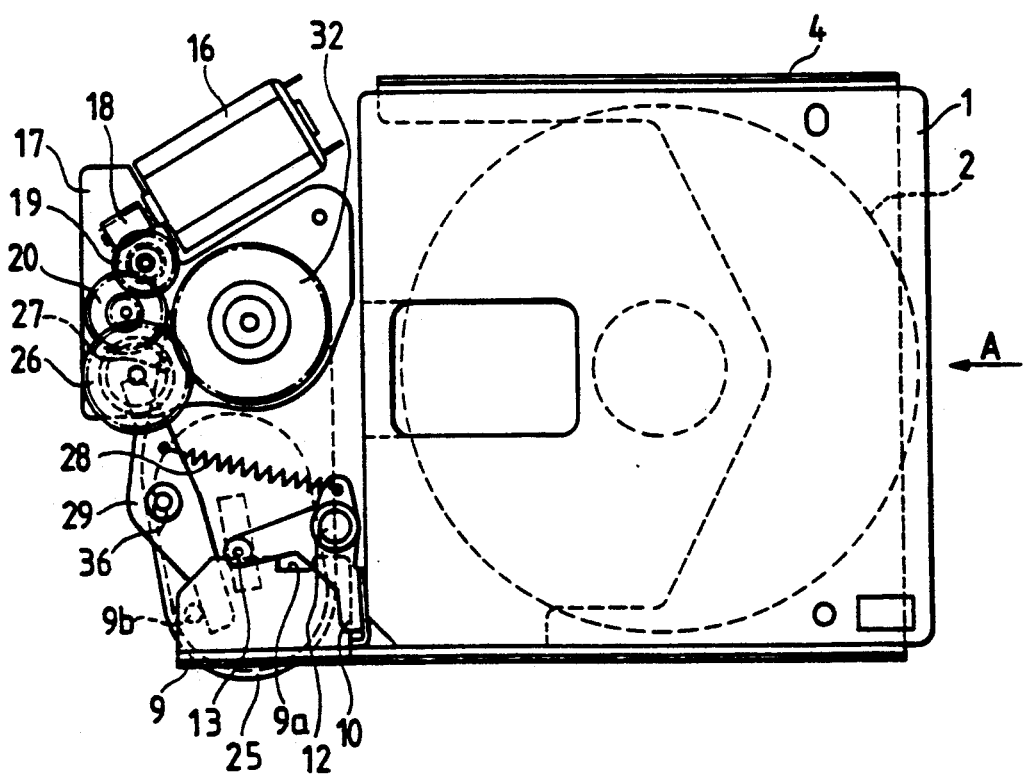
Figures 6, 7:
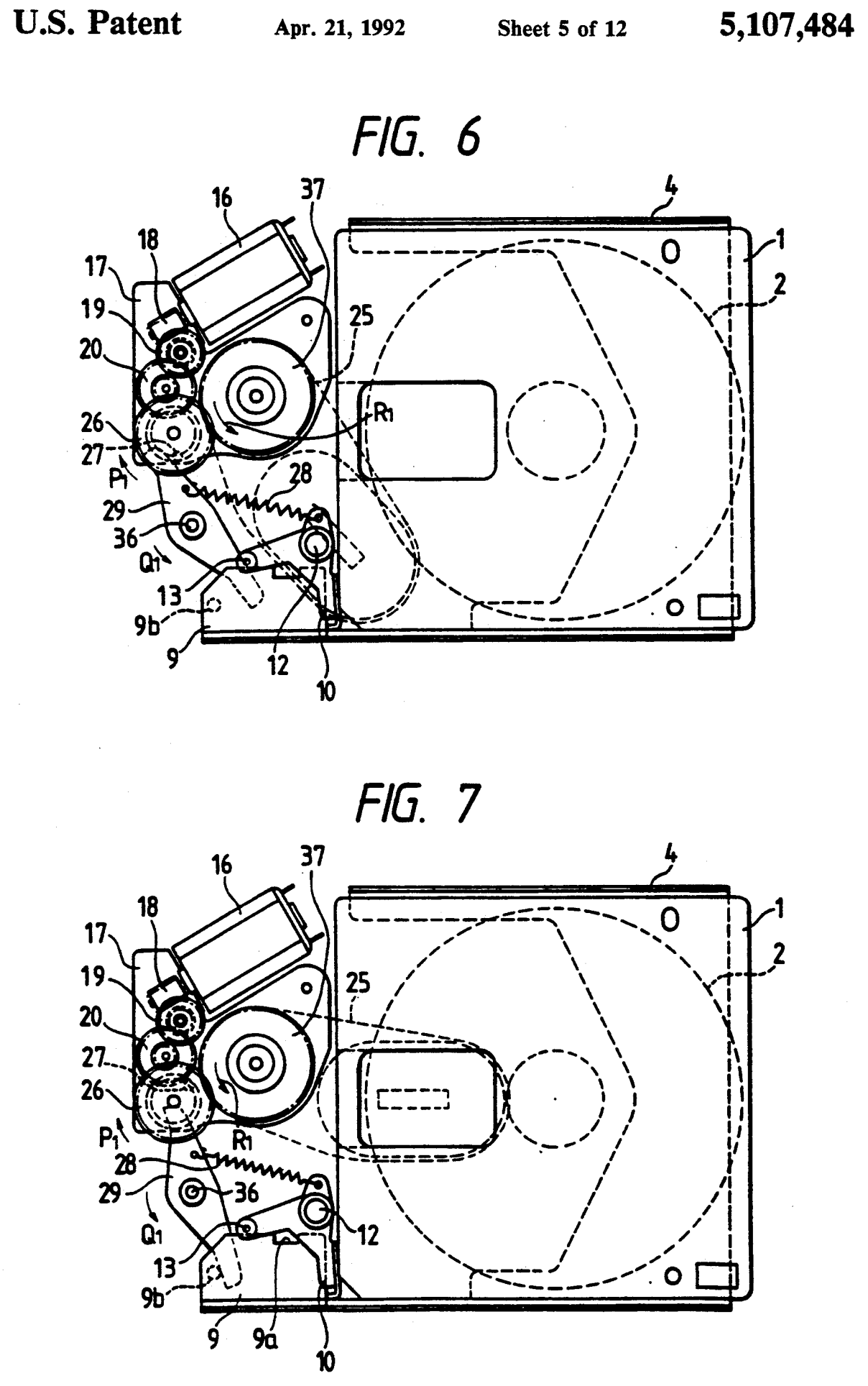

As well as in the case of reverse rotation, in the state of FIG. 5, when the flat toothed wheel 26 is rotated in a P1 direction by means of the rotating force of the drive motor 16, the ring-like toothed wheel 37 is rotated in the R1 direction and the arm 25 attached to the rotatable boss 35 is moved upwardly and is rotated so as to take the state illustrated in FIG. 6. At this time, the pin 27 comes into contact with the releasing lever 29 which in turn rotates in a Q1 direction, but is restored after the pin 27 goes over the end portion of the releasing lever 29 due to the biasing force of the spring 28. Furthermore, the rotation of the ring-like toothed wheel 37 advances, thereby taking the state of FIG. 7. Here, since the rib 32c of the rotation-supporting table 32 comes into contact with the engaging portion 35a, the arm 25 is moved downwardly. At this state, the motor 33 is rotated and the coil 8 is energized so as to allow the recording/reproducing of a signal on and from the disc 2 as well as in the conventional apparatus.

Figure 8:
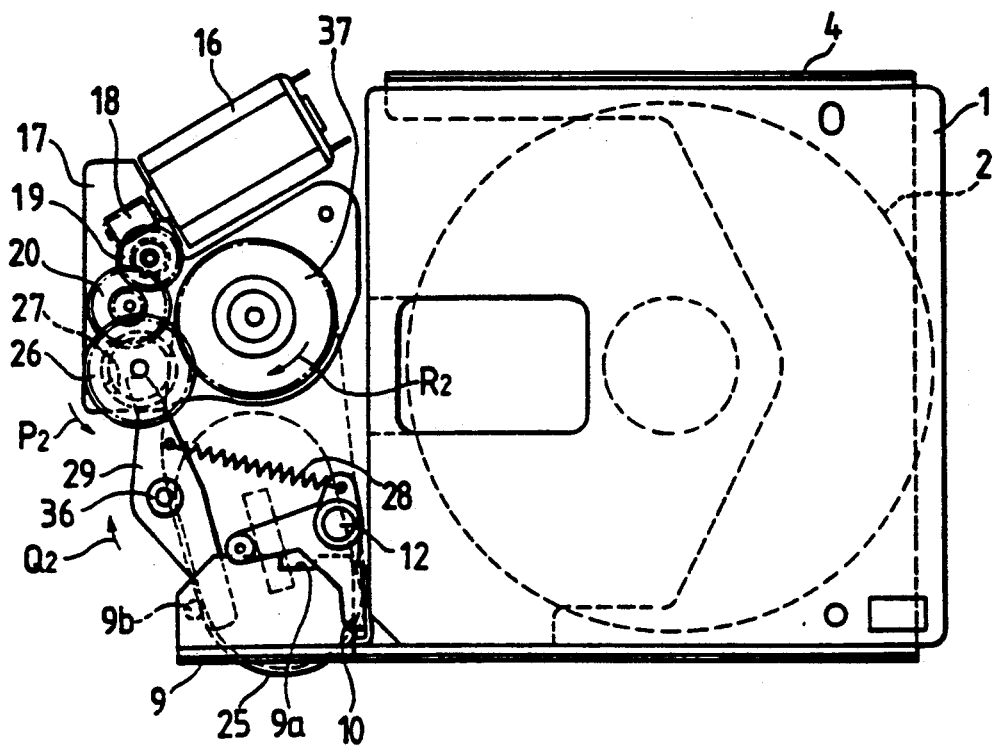

Moreover, on the contrary, when the drive motor 16 is energized in the reverse direction, the arm 25 is first moved upwardly and rotated in the direction of the arrow R2, thereby taking the state illustrated in FIG. 8.

In response to further rotation of the drive motor 16, since as shown in FIG. 8 the flat toothed wheel 26 is rotated in a P2 direction, the pin 27 comes into contact with the releasing lever 29 which in turn rotates in a Q2 direction, thereby taking the state of FIG. 9. In the state of FIG. 9, as shown by (A) of FIG. 10, the engaging portion 35a comes into contact with the rib 37a and the rotatable boss 35 and the arm 25 are moved downwardly. Even if the ring-like toothed wheel 37 is further rotated in the P2 direction, the state of the arm 25 is kept as it is. Moreover, when the releasing lever 29 is rotated in the Q2 direction, the slider 4 is drawn in the Y2 direction because the releasing lever 29 is engaged with the pin 9b of the engaging portion 9 of the slider 4, thereby returning to the original state in which the cartridge 1 can be taken out as well as in the conventional apparatus.

The above-mentioned operation is successively performed merely such that with the drive motor the flat toothed wheel 26 is moved by about one revolution in the P1 direction so as to transferred from the state of FIG. 4 to the state of FIG. 7 and then reversely rotated in the P2 direction so as to return to the state of FIG. 4.

It should be understood that the foregoing relates to only a preferred embodiment of the present invention, and that it is intended to cover all changes and modifications of the embodiment of this invention herein used for the purposes of the disclosure, which do not constitute departures from the spirit and scope of the invention.

What is claimed is:

1. A recording/reproducing apparatus comprising:
   a first motor engaged with a recording disc encased in a cartridge mounted on said apparatus to rotate said recording disc;
   engaging means for engaging said recording disc with said first motor;
   releasing means engageable with said engaging means for releasing said recording disc from said first motor;
   moving means for moving magnetic field supply means for supplying a magnetic field onto said recording disc in accordance with rotation of a second motor;
   transferring means for transferring the rotation of said second motor to said releasing means and said moving means, said transferring means being arranged so as to independently take a first transferring state for transferring the rotation of said second motor to only said releasing means and a second transferring state for transferring the rotation of said second motor to only said moving means.

2. A recording/reproducing apparatus as claimed in claim 1, wherein said transferring means has cam means whereby said moving means is movable vertically and rotatable horizontally in accordance with the rotation of said second motor.

3. A recording/reproducing apparatus including magnetic field supply means for recording and reproducing of information, comprising:
   a cartridge holder for holding a cartridge having therein a recording disc;
   a disc-driving motor arranged to allow engagement with said recording disc in said cartridge when said cartridge is inserted into said cartridge holder;
   a sliding member adapted to be engaged with said cartridge holder, said sliding member being movable substantially parallel to a chassis of said apparatus so as to cause said recording disc to be disengageable with said disc-drive motor;
   a rotatable lever, at one end portion, engageable with said sliding member so as to cause said recording disc to be disengageable with said disc-drive motor;
   toothed wheel means coupled to a reversible motor so as to be driven by the rotation of said reversible motor, said toothed wheel means having an engaging portion which is engageable with the other end portion of said rotatable lever to cause said recording disc to be disengageable with the disc-driving motor;
   an arm having at its one end portion said magnetic field supply means; and drive mechanism means coupled to said toothed wheel means so as to be driven in accordance with the rotation of said reversible motor and connected to said arm which is movable in accordance with a movement of said drive mechanism to cause said magnetic field supply means to move to be close to said recording disc and separated therefrom.

4. A recording/reproducing apparatus as claimed in claim 3, wherein drive mechanism includes cam means and rotating member connected to said arm and rotated along the configuration of said cam means whereby said arm is movable up and down and rotatable in accordance with the rotation of said reversible motor.

5. A recording/reproducing apparatus as claimed in claim 4, wherein said cam means is integrally constructed of a ring-like toothed wheel, said ring-like toothed wheel being engaged with said toothed wheel means so as to be rotated in accordance with the rotation of said reversible motor.

6. A recording/reproducing apparatus as claimed in claim 1, wherein said recording disc comprises a photomagnetically recordable medium.

7. A recording/reproducing apparatus as claimed in claim 6, wherein said magnetic field supply means operates for exposing said photomagnetically recordable medium to a magnetic field for recording and reproducing of information on and from said photomagnetically recordable medium.

8. A recording/reproducing apparatus comprising:
a first motor engaged with a recording disc encased in a cartridge mounted on said apparatus to rotate said recording disc;
engaging means for engaging said recording disc with said first motor;
releasing means engageable with said engaging means to release said recording disc from said first motor;
magnetic field supply means for supplying a magnetic field onto said recording disc;
moving means for moving magnetic field supply means in accordance with rotation of a second motor
transferring means for transferring the rotation of said second motor to said releasing means and said moving means, said moving means being movable vertically with respect to said recording disc and rotatable horizontally in a predetermined angular range by means of said transferring means in accordance with the rotation of said second motor, said transferring means being arranged so as to independently take a first transferring state for transferring the rotation of said second motor to only said releasing means and a second transferring state for transferring the rotation of said second motor to only said moving means so that said magnetic field supply means is movable vertically with respect to said recording disc and further rotatable horizontally in accordance with the vertical movement and horizontal rotation of said moving means, when taking said second transferring state, said transferring means causes said magnetic field supply means to be downwardly moved at the times of the start and end of the horizontal rotation thereof and to be upwardly moved during the horizontal rotation thereof.

9. A recording/reproducing apparatus as claimed in claim 8 wherein said recording disc comprises a photomagnetic disc.

10. A recording/reproducing apparatus as claimed in claim 9, wherein said magnetic field supply means operates for exposing said photomagnetic disc to a magnetic field for recording and reproducing information on and from said disc.

* * * * *